Dec. 11, 1923.

M. BALOGH 1,477,415

ILLUMINATED AUTOMOBILE LICENSE PLATE

Filed March 29, 1923

Inventor
M. Balogh
By Bryant
Attorney

Patented Dec. 11, 1923.

1,477,415

UNITED STATES PATENT OFFICE.

MARIA BALOGH, OF BUFFALO, NEW YORK.

ILLUMINATED AUTOMOBILE LICENSE PLATE.

Application filed March 29, 1923. Serial No. 628,531.

*To all whom it may concern:*

Be it known that I, MARIA BALOGH, a citizen of Hungary, residing at Buffalo, in the county of Erie and State of New York, have invented certain new and useful Improvements in Illuminated Automobile License Plates, of which the following is a specification.

This invention relates to certain new and useful improvements in illuminated automobile license plate and has particular reference to an improved form of lamp casing supporting a glass plate and number plate thereon in a manner to permit ready access to the interior of the lamp casing.

With the above and other objects in view as the nature of the invention is better understood, the same consists of the novel form, combination and arrangement of parts hereinafter more fully described, shown in the accompanying drawing and claimed.

Figure 1:
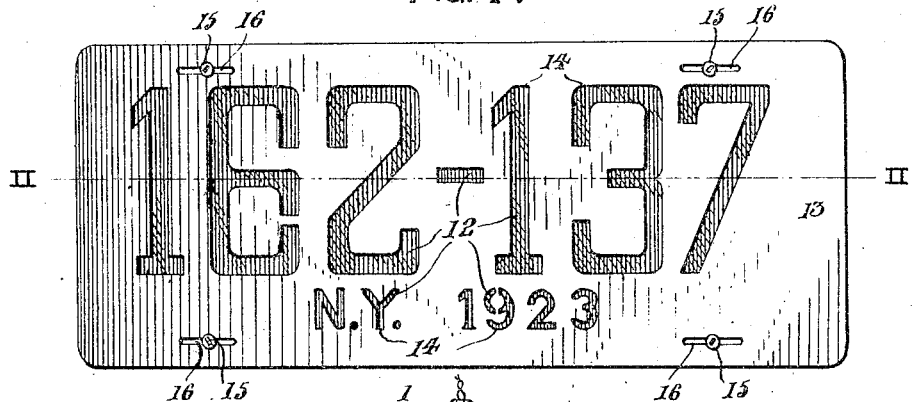
Figure 2:
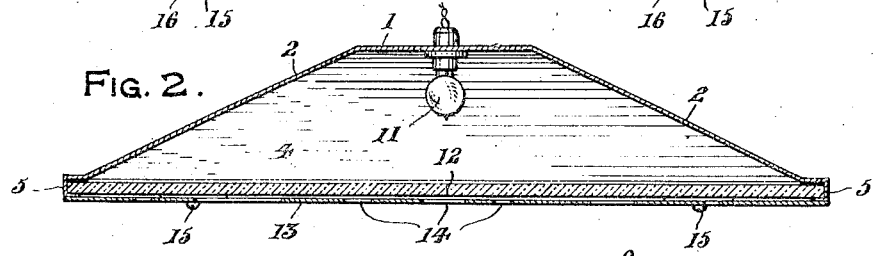
Figure 3:
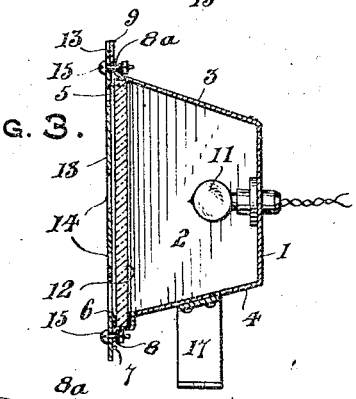
Figure 4:
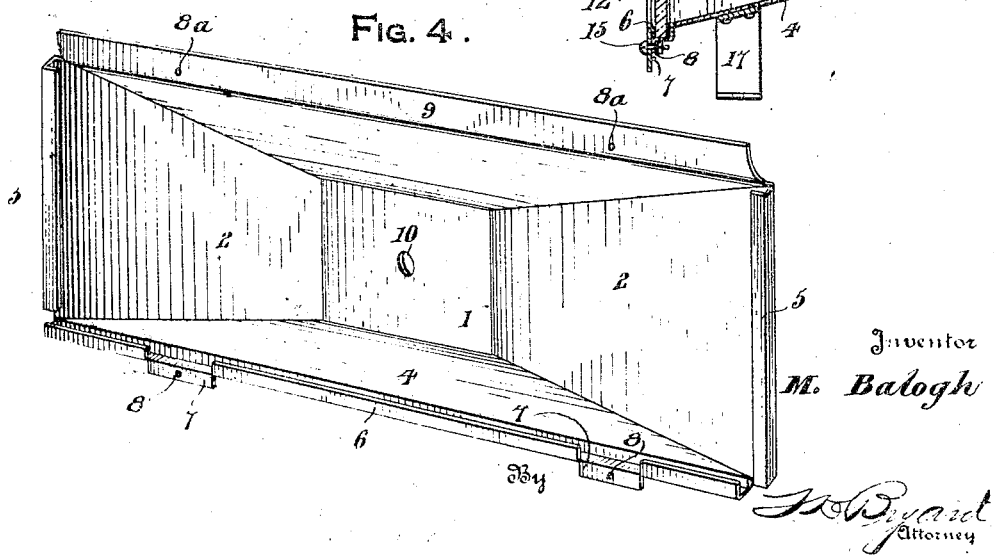

In the drawing, wherein like reference characters designate corresponding parts throughout the several views, Figure 1 is a front elevational view of an illuminated automobile license plate and holder, Figure 2 is a longitudinal sectional view taken on line II—II of Fig. 1 showing the lamp casing with which the license plate is associated, Figure 3 is a vertical cross-sectional view of the lamp casing and license plate, and Figure 4 is a perspective view of the lamp casing with the license plate removed.

Referring more in detail to the accompanying drawing, and particularly to Fig. 4 there is illustrated a lamp casing for supporting a license plate, the lamp casing including a rear wall 1 having opposite outwardly flaring end walls 2 and similar upper and lower walls 3 and 4. Each end wall 2 carries an inwardly directed channel flange 5 while the forward edge of the lower wall 4 carries an upwardly directed channel flange 6, portions thereof being struck out and bent downwardly to provide depending lugs 7 having both receiving openings 8 therein. The forward edge of the upper wall 3 carries a curved resilient flange 9 directed upwardly therefrom and provided with spaced bolt receiving openings 8ª. The rear wall 1 of the lamp casing is provided with an opening 10 to accommodate the mounting of an electric lamp 11.

A glass plate 12 extends across the forward open side of the lamp casing and is confined at its edges by the flanges 5 and 6 upon the forward edges of the side and lower walls of the lamp casing, the upper edge of the glass plate 12 terminates at the upper forward edge of the upper wall 3.

A license plate 13 having struck out portions 14 indicating license characters, such as numbers, is disposed outwardly of the glass plate 12 and securing bolts 15 passing through slotted openings 16 formed in the license plate 13 enter the openings 8 and 8ª in the depending lugs 7 and the upper resilient flange 9 of the lamp casing, the fastening bolts 15 associated with the resilient flange 9 providing the proper pressure at the upper end of the glass plate 12 to insure a rigid mounting therefor. A mounting bracket 17 is carried by the lower wall 4 of the lamp casing for securing the illuminated sign plate upon a convenient part of an automobile.

From the above detail description of the device, it is believed that the construction and operation thereof will at once be apparent, and while there is herein shown and described the preferred embodiment of the present invention, it is nevertheless to be understood that minor changes may be made therein without departing from the spirit and scope of the invention as claimed.

What I claim as new is:

1. In an illuminated automobile license plate, a lamp casing being open and rectangular at its front side, channel flanges formed at the vertical sides of the lamp casing and upon the lower forward edge thereof, the last mentioned channel flange having depending lugs, a glass plate mounted in said channel flanges, an upstanding flange formed at the forward upper edge of the lamp casing, and a license plate secured to the depending lugs and upstanding flange.

2. In an illuminated automobile license plate, a lamp casing being open and rectangular at its front side, channel flanges formed at the vertical sides of the lamp casing and upon the lower forward edge thereof, the last mentioned channel flange having depending struck out lugs formed thereon, a glass plate mounted in said channel flanges, an upstanding flange formed at the forward edge of the lamp casing, and a license plate secured to the depending lugs and upstanding flange outwardly of said glass plate.

3. In an illuminated automobile license plate, a lamp casing being open and rectangular at its front side, channel flanges formed at the vertical sides of the lamp casing and upon the lower forward edge thereof, the last mentioned channel flange having lugs struck out of the outer wall thereof and bent downwardly, a glass plate mounted in said channel flanges, an upstanding resilient flange formed at the forward upper edge of the lamp casing, and a perforated license plate secured to the downwardly bent struck out lugs and upstanding resilient flange outwardly of the glass plate.

In testimony whereof I affix my signature.

MARIA BALOGH.